United States Patent
Forster

(10) Patent No.: US 9,538,109 B2
(45) Date of Patent: Jan. 3, 2017

(54) LIGHT PROPAGATION TIME CAMERA

(75) Inventor: Florian Forster, Tettnang (DE)

(73) Assignee: IFM ELECTRONIC GMBH, Essen (DE)

( * ) Notice: Subject to any disclaimer, the term of this patent is extended or adjusted under 35 U.S.C. 154(b) by 289 days.

(21) Appl. No.: 13/876,189

(22) PCT Filed: Aug. 22, 2011

(86) PCT No.: PCT/EP2011/064375
§ 371 (c)(1),
(2), (4) Date: Mar. 27, 2013

(87) PCT Pub. No.: WO2012/041607
PCT Pub. Date: Apr. 5, 2012

(65) Prior Publication Data
US 2013/0307968 A1    Nov. 21, 2013

(30) Foreign Application Priority Data

Sep. 30, 2010 (DE) .......... 10 2010 041 785
Nov. 11, 2010 (DE) .......... 10 2010 043 768

(51) Int. Cl.
*H04N 5/378* (2011.01)
*G01S 7/497* (2006.01)
*G01S 17/89* (2006.01)

(52) U.S. Cl.
CPC .......... *H04N 5/378* (2013.01); *G01S 7/497* (2013.01); *G01S 17/89* (2013.01)

(58) Field of Classification Search
CPC .......... H04N 5/378; G01S 7/497; G01S 17/89

USPC .................................. 348/135, 138
See application file for complete search history.

(56) References Cited

U.S. PATENT DOCUMENTS

| | | | | |
|---|---|---|---|---|
| 5,541,645 A | * | 7/1996 | Davis | H04N 5/2353 |
| | | | | 348/96 |
| 6,100,517 A | * | 8/2000 | Yahav et al. | 250/208.1 |
| 6,587,186 B2 | * | 7/2003 | Bamji et al. | 356/5.01 |
| 6,825,455 B1 | * | 11/2004 | Schwarte | 250/214.1 |
| 7,555,062 B2 | | 6/2009 | Gollewski et al. | |
| 7,586,077 B2 | * | 9/2009 | Lehmann | G01S 7/4816 |
| | | | | 250/208.1 |

(Continued)

FOREIGN PATENT DOCUMENTS

| | | |
|---|---|---|
| DE | 19704496 A1 | 3/1998 |
| DE | 102004016625 A1 | 10/2005 |

(Continued)

*Primary Examiner* — James Boylan
(74) *Attorney, Agent, or Firm* — Leydig, Voit & Mayer, Ltd.

(57) ABSTRACT

A time-of-flight camera includes a photosensor and a reference photosensor. Each of the photosensors have accumulation gates and each are configured as a photomixing detector (PMD). A readout device is connected to the accumulation gates of the photosensor and to the accumulation gates of the reference photosensor. The readout device is configured to read out an electric quantity that corresponds to a charge that is present at respective ones of the accumulation gates. An integration time of accumulating the charges is the same for the photosensor and for the reference photosensor and is dimensioned so as to prevent the reference photosensor from reaching saturation during operation of the time-of-flight camera.

12 Claims, 4 Drawing Sheets

(56) References Cited

U.S. PATENT DOCUMENTS

| | | | |
|---|---|---|---|
| 7,952,690 B2 | 5/2011 | Cauquy et al. | |
| 8,179,433 B2* | 5/2012 | Fujiki | 348/79 |
| 2002/0163576 A1* | 11/2002 | Ishino et al. | 348/136 |
| 2004/0151074 A1* | 8/2004 | Spears | 368/113 |
| 2005/0237593 A1 | 10/2005 | Xu et al. | |
| 2006/0152610 A1* | 7/2006 | Voronov | H04N 5/2251 348/294 |
| 2007/0187572 A1* | 8/2007 | Subbotin | 250/201.7 |
| 2010/0039547 A1* | 2/2010 | Kinugasa | 348/308 |
| 2010/0123504 A1* | 5/2010 | Lauxtermann et al. | 327/331 |
| 2011/0101206 A1 | 5/2011 | Buettgen | |
| 2012/0287242 A1* | 11/2012 | Gilboa et al. | 348/46 |
| 2013/0026384 A1* | 1/2013 | Kim et al. | 250/393 |
| 2013/0120565 A1* | 5/2013 | Wilks | G01S 7/497 348/135 |
| 2014/0152813 A1* | 6/2014 | Wilks et al. | 348/138 |
| 2014/0267613 A1* | 9/2014 | Cohen et al. | 348/46 |

FOREIGN PATENT DOCUMENTS

| | | |
|---|---|---|
| DE | 102004044581 A1 | 3/2006 |
| EP | 1009984 B1 | 6/2006 |
| EP | 1777747 A1 | 4/2007 |
| EP | 2017651 A2 | 1/2009 |
| WO | WO 2008034738 A1 | 3/2008 |

* cited by examiner

US 9,538,109 B2

LIGHT PROPAGATION TIME CAMERA

CROSS REFERENCE TO RELATED APPLICATIONS

This application is a U.S. National Phase application under 35 U.S.C. §371 of International Application No. PCT/EP2011/064375, filed on Aug. 22, 2011, and claims benefit to German Patent Application Nos. DE 10 2010 041 785.8, filed Sep. 30, 2010 and DE 10 2010 043 768.9, filed on Nov. 11, 2010. The International Application was published in German on Apr. 5, 2012 as WO 2012/041607 under PCT Article 21(2).

FIELD

The invention relates to a time-of-flight camera and to a method for operating such a camera as set forth in the independent claims.

BACKGROUND

The term "time-of-flight camera system" is meant to encompass not only systems that measure distances directly from the time of flight (TOF) but also and especially all time-of-flight camera systems or 3D-TOF camera systems that acquire time-of-flight information from the phase shift of emitted and received radiation. Particularly well-suited time-of-flight cameras or 3D-TOF cameras are PMD cameras with photonic mixer devices (PMD) of the type described, among others, in European patent application EP 1 777 747, U.S. Pat. No. 6,587,186 and German patent application DE 197 04 496, and commercially available, for example, from the "ifm electronic gmbh" company under the name Frame Grabber O3D. In particular, a PMD camera allows a flexible arrangement of the light source and of the detector, which can be arranged in a housing as well as separately. It goes without saying that the terms "camera" or "camera system" also include cameras or devices that have at least one receiving pixel such as, for instance, the O1D distance sensor made by the applicant.

German patent application DE 10 2004 044 581 A1 likewise discloses a method and a device for the time-of-flight-sensitive measurement of a signal in which the phase and the amplitude of an intensity-modulated input signal are determined. The input signal is mixed with a first reference signal, whereby the phase of the signal is subsequently determined by means of an IQ process employing an odd and even autocorrelation function.

German patent application DE 10 2004 016 625 A1 discloses a PMD system for receiving and processing modulated electromagnetic signals in which a semiconductor is configured to receive and convert electromagnetic radiation into an electric measured quantity. The semiconductor has an input for a modulated signal as well as at least two accumulation electrodes that are connected to an output electronic unit and at whose output a mixture of the received signal and of a modulation signal is provided as an electric signal.

SUMMARY

In an embodiment, the present invention provides a time-of-flight camera having a photosensor and a reference photosensor. Each of the photosensors have accumulation gates and each are configured as a photomixing detector (PMD). A readout device is connected to the accumulation gates of the photosensor and to the accumulation gates of the reference photosensor. The readout device is configured to read out an electric quantity that corresponds to a charge that is present at respective ones of the accumulation gates. An integration time of accumulating the charges is the same for the photosensor and for the reference photosensor and is dimensioned so as to prevent the reference photosensor from reaching saturation during operation of the time-of-flight camera.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

In the following description of preferred embodiments, identical or comparable components are designated with the same reference numerals.

DETAILED DESCRIPTION

Figure 1:
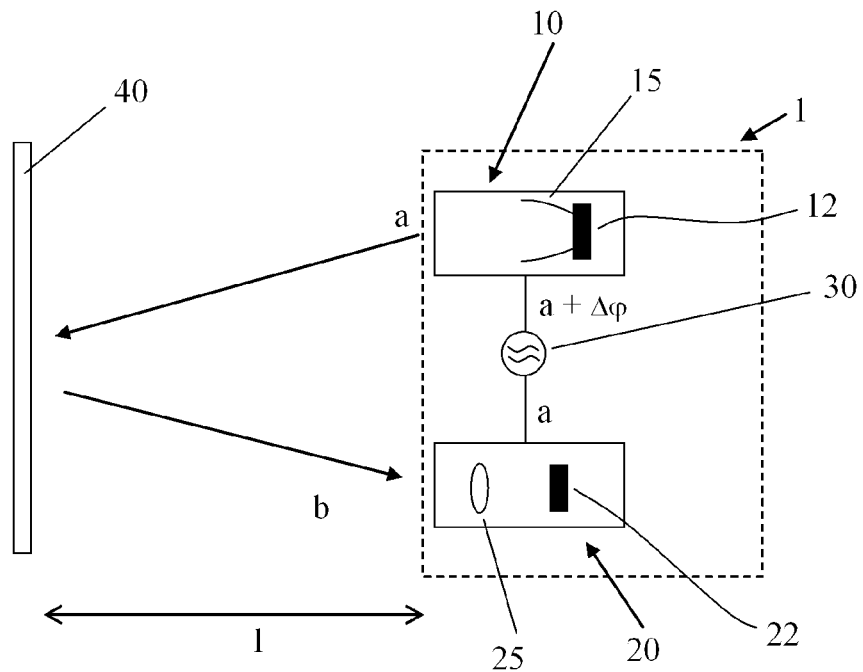
FIG. 1 shows the fundamental principle of a time-of-flight camera according to the PMD principle.

In an embodiment, the invention to improves the reliability of the distance measurements of a time-of-flight camera.

Advantageously, a time-of-flight camera is provided with a photosensor and a reference photosensor in which both sensors are configured as photomixing detectors. A readout device is connected to the accumulation gate of both sensors, where it reads out a quantity that corresponds to a charge that is present at the accumulation gate. The integration time with which the accumulation gate is operated is the same for both sensors and is dimensioned in such a way that the accumulation gates of the reference photosensor do not reach saturation during operation.

It has been found that, among others, the electric behavior of the photosensors changes as the integration times vary, so that in individual cases, the measured results involving different integration times cannot be compared directly to each other. In order to be able to employ the measured results as a reference, particularly in the case of a measurement using a reference photosensor, it is advantageously provided according to an embodiment of the invention for the integration times for the photosensor and for the reference photosensor to be selected with the same magnitude and to be adapted as a function of the requirements of the reference photosensor.

Likewise advantageously, a method is provided in which the received radiation is mixed with a modulation frequency, after which the phase shift is determined, whereby the phase shift of an external light is determined for a photosensor, and the phase shift of an internal light is ascertained for a reference photosensor. The integration time for the reference photosensor and for the photosensor is selected with the same magnitude and dimensioned in such a way that the reference photosensor does not reach saturation direction operation.

In another embodiment, it is provided that the photosensor and the reference photosensor are structured as a joint component. This advantageously ensures that both sensors are essentially exposed to the same ambient conditions.

It also advantageous for the reference photosensor and for the photosensor or an individual PMD pixel of these sensors to have essentially the same physical and electric properties.

It is likewise provided that, within a prescribed measuring interval, the charges at the accumulation gate of the photosensor are sequentially integrated multiple times with the specified integration time, and the electric quantity that corresponds to the charge is read out and added up. Thus, in an advantageous manner, a distance error due to an insufficient amount of light can be avoided since the addition of the charges over several measurements makes it possible to ascertain a distance value that is essentially equally reliable.

Preferably, the charges at the accumulation gates can also be read out sequentially multiple times until the sum of the corresponding read-out electric quantities has exceeded a limit value. With such an approach, it is easy to adapt to the light conditions dynamically.

FIG. 1 shows a measuring situation for an optical distance measurement with a time-of-flight camera of the type disclosed, for example, in German specification DE 197 04 496.

The time-of-flight camera system 1 comprises an emitting unit or an illumination module 10 having an illumination source 12 and an associated beam-forming optical system 15 as well as a receiving unit or a TOF camera 20 having a receiving optical system 25 and a photosensor 22. The photosensor 22 has at least one pixel, preferably, however, a pixel array, and it is especially configured as a PMD sensor. With an eye towards improving the imaging properties, the receiving optical system 25 typically consists of several optical elements. The beam-forming optical system 15 of the emitting unit 10 is preferably configured as a reflector. However, diffractive elements or combinations of reflective and diffractive elements can also be employed.

The measuring principle of this arrangement is essentially based on the fact that the time of fight of the emitted and reflected light can be determined on the basis of the phase shift of the emitted and received light. For this purpose, a modulator 30 impinges a certain modulation frequency having a first phase angle a onto the light source 12 as well as onto the photosensor 22. In accordance with the modulation frequency, the light source 12 emits an amplitude-modulated signal having the phase a. In the case presented here, this signal or the electromagnetic radiation is reflected off an object 40 and, owing to the distance it has traveled, it strikes the photosensor 22 correspondingly phase-shifted at a second phase angle b. In the photosensor 22, the signal of the first phase angle a of the modulator 30 is mixed with the received signal that has the time-of-flight-related second phase angle b, whereby the phase shift or the object distance 1 is determined on the basis of the resulting signal.

Figure 2:
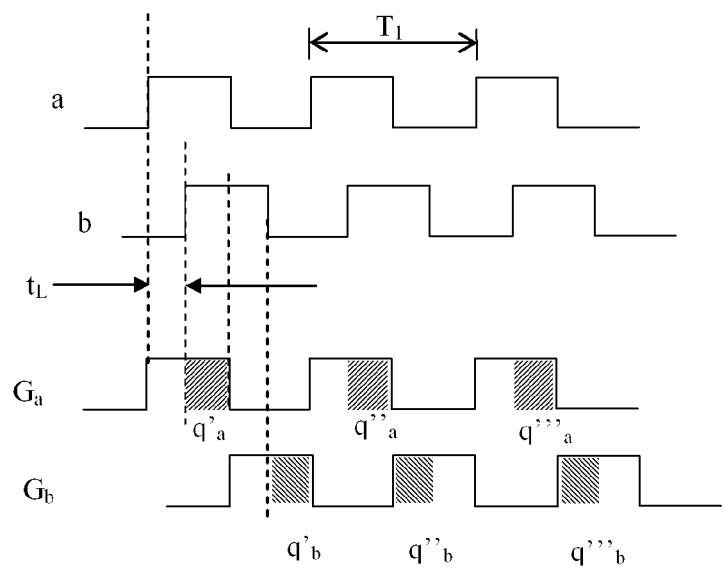
FIG. 2 shows a modulated integration of the charge carriers generated with a time-of-flight shift.
Figure 3:
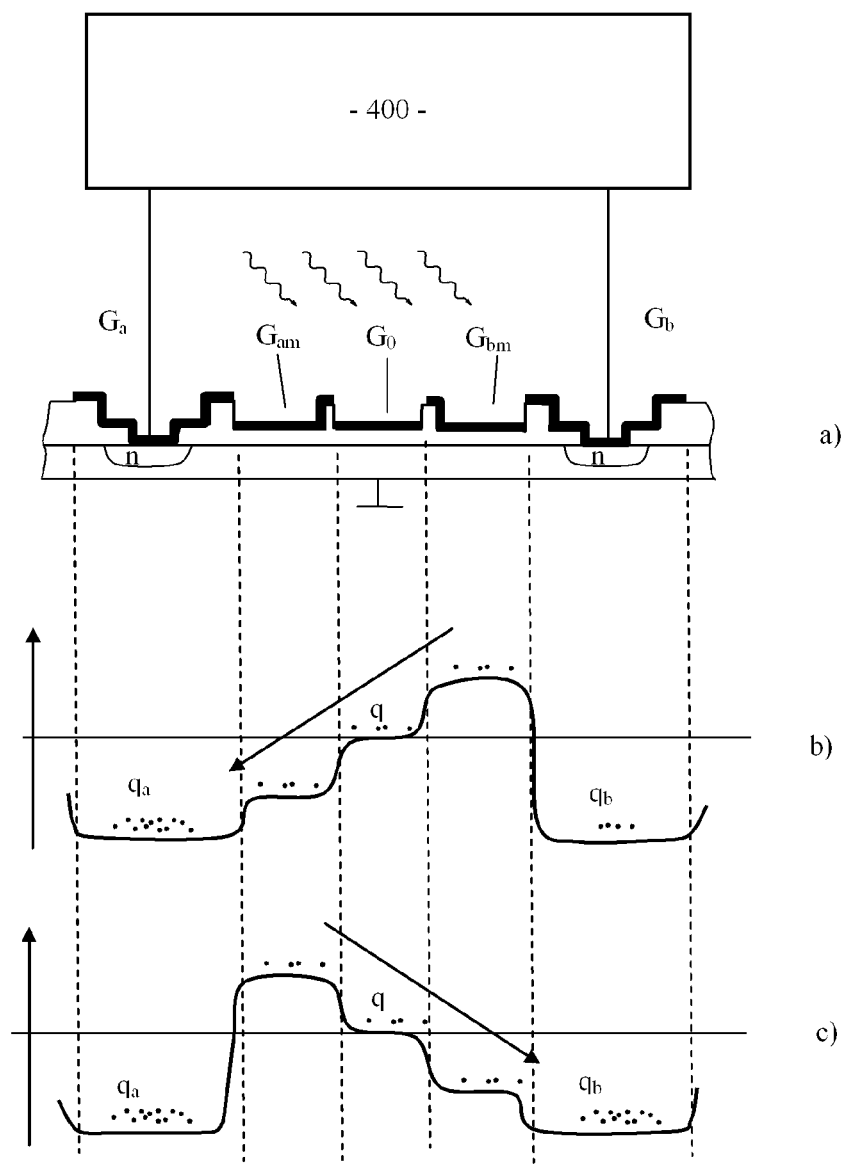
FIG. 3 shows a cross section of a PMD pixel.

This fundamental principle is schematically shown in FIG. 2. The upper curve (shown as a square wave) shows the course-over-time of the modulation frequency with which the illumination source 12 and the photosensor 22 are actuated. The light b reflected off the object 40 strikes the photosensor 22 with a phase shift as a function of its time of flight tL. The photosensor 22 collects the photonically generated charges q during the first half of the modulation period in a first accumulation gate Ga and in a second period half in the second accumulation gate Gb. The charges are typically collected or integrated over several modulation periods. On the basis of the ratio of the charges qa, qb collected in the first and second gates Ga, Gb, the phase shift and thus a distance of the object can be determined FIG. 3 shows a cross section through a pixel of the photomixing detector of the type known, for example, from German patent specification DE 197 04 496 C2. The middle modulation photo gates Gam, G0, GBM form the light-sensitive area of a PMD pixel. As a function of the voltage that has been applied at the modulation gates, the photonically generated charges q are sent to one or the other accumulation gate Ga, Gb.

FIG. 3b shows a potential curve in which the charges q flow in the direction of the first accumulation gate Ga, while the potential according to FIG. 3c causes the charge q to flow in the direction of the second accumulation gate Gb. The potentials are prescribed in accordance with the modulation frequency that is present. Depending on the case at hand, the modulation frequencies are preferably in a range from 1 MHz to 100 MHz. A modulation frequency of, for instance, 1 MHz, yields a periodic time of one microsecond, so that the modulation potential changes every 500 nanoseconds accordingly.

FIG. 3a also shows a readout unit 400 that can likewise be an integral part of a PMD photosensor configured as a CMOS. The accumulation gates Ga, Gb, which are configured as capacitors, integrate the photonically generated charges over a plurality of modulation periods. In a known manner, the voltage that is then present at the gates Ga, Gb can be tapped at a high impedance via the readout unit 400. The integration times should be preferably selected in such a way that the photosensor or the accumulation gates and/or the light-sensitive areas do not reach saturation for the amount of light that can be expected.

Figure 4:
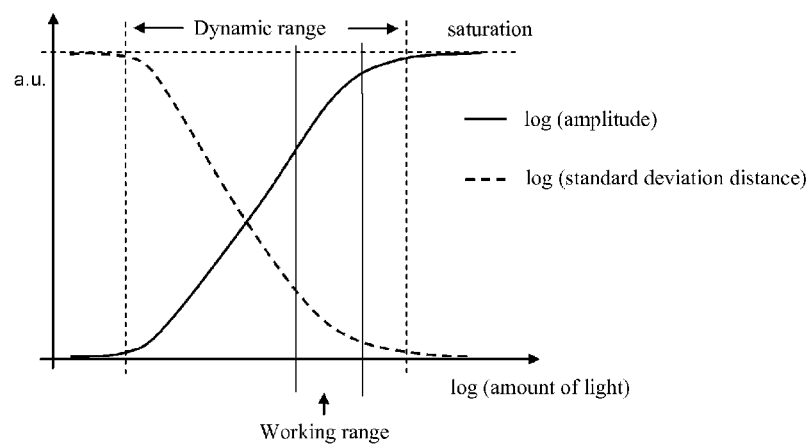
FIG. 4 shows the dependence of the amplitude and of the distance error as a function of the amount of incident light.

FIG. 4 schematically shows the dependence of an electric quantity of the photosensor or of an accumulation gate as a function of the amount of light. The amount of light can be determined in a known manner from the light flow and the duration of the irradiation. The charge carriers are generated in the photosensitive area Gam, G0, Gbm proportionally to the amount of light, and then distributed to the accumulation gates Ga, Gb in a phase-correlated manner corresponding to the modulation frequency. These charges can be either tapped at the gate at a high impedance as a voltage signal or amplitude or else measured as a current when the gates discharge. These electric quantities thus correspond to the phase-correlated light flow or to the corresponding amount of light.

The possible dynamic range typically extends over several orders of magnitude. The magnitude of the dynamic range depends essentially on the surface of the photosensitive layer of a pixel as well as on the capacity of the accumulation gates. The integration time for the photosensor or for a single pixel is preferably specified in such a way that the sensor does not reach saturation in this application case. However, as the amount of light diminishes, or analogously as the integration time diminishes, the potential at the accumulation gate decreases steadily and brings about an increasing uncertainty for the distance determination, among other things, due to the decreasing signal-to-noise ratio, as is shown by the broken curve of the standard deviation in FIG. 4. Therefore, the lower limit of the working range of the integration time should be selected in such a way that any distance error to be expected still falls within a permissible tolerance or standard deviation, whereby the upper limit should preferably be below saturation.

Figure 5:
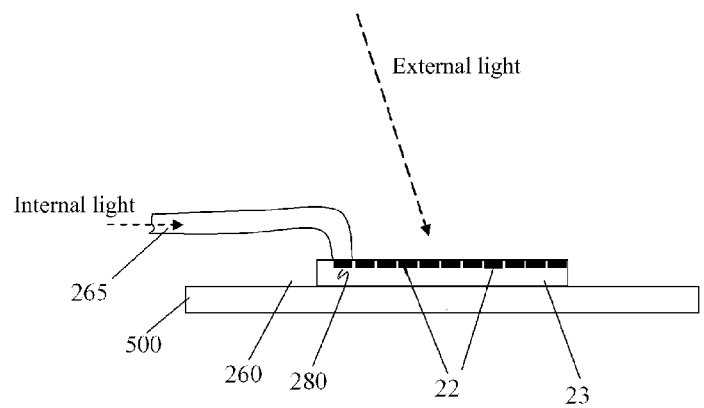
FIG. 5 shows a component with a photosensor and a reference photosensor.

FIG. 5 shows a photosensor component 23 with a photosensor area 22 comprising several PMD pixels as well as a reference sensor 280 on or in the same component 23. The reference photosensor 280 is illuminated via a light channel 265, preferably with a modulated, internal light. The internal light can come, for example, from a source of reference light or else be sent directly to the reference photosensor 280 from the source of illumination light, for instance, via a light guide or light channel 265.

The internal light is made available to the reference photosensor preferably at the modulation frequency at which the illumination source is also operated. As a simplification, a distance value of zero should be determined as the result at the reference photosensor 280 using illumination with such a non-phase-shifted light. Of course, this reference result does not necessarily have to correspond to an electric zero signal, but rather, should be reproducible as the reference value at least within tolerated limits.

For instance, temperature-induced shifts of the distance measurements or, if applicable, also ageing of the sensor, of the light source or the like can be compensated for via the behavior of the reference photosensor or of a determined reference value. In the arrangement shown in FIG. 5, the reference photosensor 280 is preferably operated at the same modulation frequency and integration time as the other photosensor 22. In order for the reference photosensor 280 not to reach saturation at these prescribed integration times, for example, the light outcoupled from the illumination source via the light channel 265 can be dimensioned in such a way that the reference photosensor 268 does not reach saturation.

According to an embodiment of the invention, however, it is now provided that it is not or not only the light internally added to the reference photosensor 280 that should be influenced, but rather the integration times. For example, in a calibration phase, the integration time is preferably set in such a way that the reference photosensor 280 can be operated in an optimal working range just below its saturation or a saturation limit. According to an embodiment of the invention, it is then further provided that the other reference photosensor 280 is also operated with the integration time of the reference photosensor 280 in order to improve the comparability of the reference and distance measurements.

Figure 6:
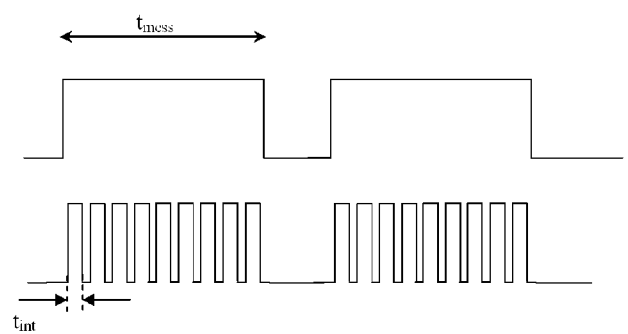
FIG. 6 shows a long measurement interval and a sequence of short integration times.

By way of an example, FIG. 6 shows a possible operation of a photosensor 22 with several measuring intervals within which the charge integrations are carried out over the entire measuring interval. The measuring intervals should preferably be dimensioned in such a way that a sufficient number of charge carriers q for a reliable measurement can be collected at the accumulation gates Ga, Gb. According to an embodiment of the invention, it is provided for the accumulation gates Ga, Gb to be read out after each integration and for the charge or a corresponding electric quantity to be added up.

It can also be provided that, for several measuring intervals, the modulation signal of the modulator 30 is shifted in the phase between the light source 12 and the photosensor 22 or the reference photosensor 280. Preferably, phase shifts $A\Delta\phi$ of 0°, 90°, 180°, 270° are provided for the various measuring intervals. On the basis of the results of this phase measurement, a reliable distance value can be determined in a known manner.

Figure 7:
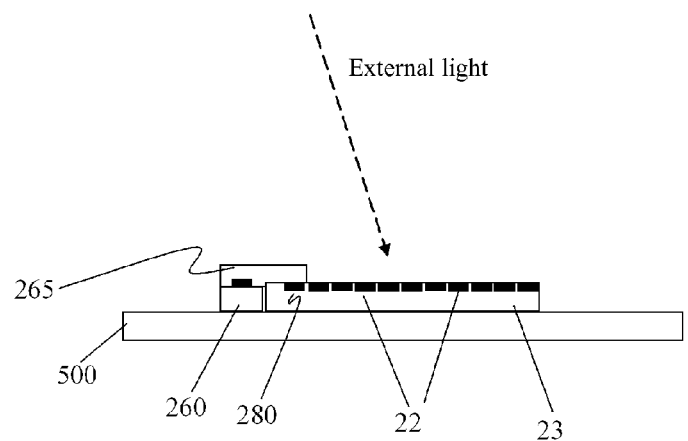
FIG. 7 shows an arrangement with a reference light source.

FIG. 7 shows an arrangement according to FIG. 5, in which, however, the internal light for the reference photosensor 280 is not outcoupled from the illumination source 12 or the emitting unit 10 itself but rather from a reference light source 260. This approach has the advantage that, if applicable, the reference photosensor 280 can also be operated independently of the emitting unit 10. Thus, for instance, a light having different modulation frequencies or else different amplitudes can be applied to the reference photosensor 280. If the measured results diverge from what is expected, then it is optionally possible to initiate various error responses or else calibration measures.

In addition, it can also be provided for the reference photosensor 280 to be configured as a separate component.

In particular, it is likewise conceivable to position the reference photosensor 280 in the vicinity of the illumination source 12 so that the reference photosensor 280 can receive light from the illumination source 12 either directly or, if applicable, indirectly via reflections, without using a light guide. This approach is particularly interesting if the reference photosensor 280 is also being used to monitor the illumination source 12.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE NUMERALS 10 emitting unit
12 source of illumination light
15 beam-forming optical system
20 receiving unit, TOF camera
22 photosensor
23 photosensor component
205 light channel
280 reference photosensor, reference pixel, reference pixel structure
25 receiving optical system
30 modulator
40 object
400 readout unit
500 component carrier
$G_{am}$, $G_0$, $G_{bm}$ modulation photogates
$G_a$, $G_b$ accumulation gates
q charges
$q_a$, $q_b$ charges at the accumulation gates $G_a$, $G_b$

The invention claimed is:

1. A time-of-flight camera, comprising:
a photosensor and a reference photosensor, each of the photosensors having accumulation gates and being configured as a photomixing detector (PMD); and
a readout device connected to the accumulation gates of the photosensor and to the accumulation gates of the reference photosensor, wherein the readout device is configured to read out an electric quantity that corresponds to a charge that is present at respective ones of the accumulation gates,
wherein the time-of-flight camera is configured to set, in a calibration phase, an integration time for accumulating charges based on the reference photosensor in that the integration time is dimensioned so as to prevent every pixel of the reference photosensor from reaching saturation during operation of the time-of-flight camera, the integration time being the same for every pixel of the photosensor and for every pixel of the reference photosensor.

2. The time-of-flight camera according to claim 1, wherein at least an individual PMD pixel of the reference photosensor and at least an individual PMD pixel of the photosensor have the same physical and electric properties.

3. The time-of-flight camera according to claim 1, wherein the reference photosensor and the photosensor are structured as a joint photosensor component.

4. The time-of-flight camera according to claim 1, wherein the readout device is configured to sequentially integrate the charges at the accumulation gates of the photosensor in multiple ones of the integration time within a measuring interval and to read out and add up the electric quantity from the respective integration times.

5. The time-of-flight camera according to claim 1, wherein the reference photosensor includes only a single reference pixel.

6. The time-of-flight camera according to claim 1, further comprising a light channel configured to outcouple light from an illumination source of the time-of-flight camera to the reference photosensor and dimension the light in such a way that the reference photosensor is prevented from reaching saturation.

7. A method for operating a time-of-flight camera, comprising:
providing a photosensor and a reference photosensor, each of the photosensors having accumulation gates and being configured as a photomixing detector (PMD), the accumulation gates of the photosensors being connected to a readout device;
setting, in a calibration phase, an integration time for accumulating charges based on the reference photosensor in that the integration time is dimensioned so as to prevent every pixel of the reference photosensor from reaching saturation during operation of the time-of-flight camera; and
reading out, using the readout device, an electric quantity that corresponds to a charge that is present at respective ones of the accumulation gates using the integration time of accumulating the charges that is the same for every pixel of the photosensor and for every pixel of the reference photosensor.

8. The method according to claim 7, further comprising:
receiving at the photosensor radiation from an external light and receiving at the reference photosensor radiation from an internal light;
mixing the radiation received by the photosensors with a modulation frequency; and
determining, after the mixing, a phase shift of the external light and a phase shift of the internal light.

9. The method according to claim 7, further comprising sequentially integrating the charges at the accumulation gates of the photosensor in multiple ones of the integration time within a measuring interval and reading out and adding up the electric quantity from the respective integration times.

10. The method according to claim 7, wherein the reading out is performed sequentially multiple times until the sum of the corresponding read-out electric quantities has exceeded a limit value.

11. The method according to claim 7, wherein the reference photosensor includes only a single reference pixel.

12. The method according to claim 7, further comprising outcoupling light from an illumination source of the time-of-flight camera to the reference photosensor and dimensioning the light in such a way that the reference photosensor is prevented from reaching saturation.

* * * * *